US007817395B2

(12) United States Patent
Durth

(10) Patent No.: US 7,817,395 B2
(45) Date of Patent: Oct. 19, 2010

(54) OVERVOLTAGE PROTECTION ELEMENT AND IGNITION ELEMENT FOR AN OVERVOLTAGE PROTECTION ELEMENT

(75) Inventor: Rainer Durth, Horn-Bad Meinberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 11/062,636

(22) Filed: Feb. 23, 2005

(65) Prior Publication Data

US 2005/0185356 A1 Aug. 25, 2005

(30) Foreign Application Priority Data

Feb. 23, 2004 (DE) ....................... 10 2004 009 072

(51) Int. Cl.

*H02H 7/20* (2006.01)
*H02H 1/00* (2006.01)
*H02H 1/04* (2006.01)
*H02H 3/22* (2006.01)
*H02H 9/06* (2006.01)
*H01C 7/12* (2006.01)

(52) U.S. Cl. ....................... 361/112; 361/117; 361/118; 361/120; 361/128

(58) Field of Classification Search ................. 361/112, 361/117, 118, 120, 128
See application file for complete search history.

(56) References Cited

U.S. PATENT DOCUMENTS 3,627,905 A * 12/1971 Astle-Fletcher et al. ....... 174/80
3,680,397 A * 8/1972 Haeusler et al. ................ 72/56
5,714,794 A * 2/1998 Tsuyama et al. ............ 257/522
5,915,757 A 6/1999 Tsuyama et al.
6,111,740 A 8/2000 Danowsky et al.
6,529,361 B1 * 3/2003 Petschel et al. ............. 361/120
6,788,519 B2 * 9/2004 Zahlmann et al. ........... 361/129

FOREIGN PATENT DOCUMENTS

DE 2120214 A1 3/1972
DE 23 37 743 A1 2/1975

(Continued)

OTHER PUBLICATIONS

European Search Report dated Apr. 17, 2007 for EP 05 003261.

*Primary Examiner*—Jared Fureman
*Assistant Examiner*—Lucy Thomas
(74) *Attorney, Agent, or Firm*—Roberts Mlotkowski Safran & Cole, P.C.; David S. Safran

(57) ABSTRACT

An overvoltage protection element for discharging transient overvoltages with at least two electrodes, with at least one ignition element of insulating material located between the electrodes, and with an air breakdown spark gap which acts between the electrodes, when the air breakdown spark gap is ignited an arc being formed between the two electrodes. An overvoltage protection element is provided with an ignition element which can be produced especially easily, the ignition element being made and arranged such that, between the two electrodes, there is an area of weakened insulation (ignition area) and when there is a voltage on the ignition element, a discharge on the surface of the ignition element leads to a conductive connection between the two electrodes, the conductive connection having a low current carrying capacity.

15 Claims, 8 Drawing Sheets

FOREIGN PATENT DOCUMENTS

| | | | | |
|---|---|---|---|---|
| DE | 41 41 681 | A1 | | 7/1993 |
| DE | 42 44 051 | A1 | | 7/1994 |
| DE | 4244051 | | * | 7/1994 |
| DE | 44 02 615 | A1 | | 12/1994 |
| GB | 115038 | | | 7/1919 |
| GB | 545 677 | | | 6/1942 |
| GB | 2 345 390 | A | | 7/2000 |
| JP | 2-046680 | A | | 2/1990 |

* cited by examiner

OVERVOLTAGE PROTECTION ELEMENT AND IGNITION ELEMENT FOR AN OVERVOLTAGE PROTECTION ELEMENT

BACKGROUND OF THE INVENTION

1. Field of the Invention

The invention relates to an overvoltage protection element for discharging transient overvoltages, with at least two electrodes, with at least one ignition element of insulating material located between the electrodes, and with an air breakdown spark gap which acts between the electrodes, when the air breakdown spark gap between the two electrodes is ignited, an arc being formed. In addition, the invention relates to an ignition element for use in an overvoltage protection element.

2. Description of Related Art

Electrical, but especially electronic measurement, control and switching circuits, mainly also telecommunications equipment and systems, are sensitive to transient overvoltages, as can occur especially by atmospheric discharges, but also by switching operations or short circuits in power supply circuits. This sensitivity has increased to the extent electronic components, especially transistors and thyristors, are being used; in particular, increasingly used integrated circuits are highly endangered by transient overvoltages. Overvoltages can to a major extent destroy electrical and electronic equipment and systems. Damage is not limited to industrial and commercial systems. Building hardware, including household appliances, such as cooking appliances, telephone systems, television sets, hi-fi systems and computers, are affected. Without effective protective measures against overvoltages, high costs for repair or repurchase of the affected systems and devices must be expected.

Electrical circuits normally work without problems using the voltage specified for them, the rated voltage. This does not apply when overvoltages occur. Overvoltages are all voltages which are above the upper tolerance limit of the rated voltage. They also include mainly transient overvoltages which can occur due to atmosphere discharges, but also due to switching operations or short circuits in power supply circuits, and can be galvanically, inductively or capacitively coupled into electronic circuits. In order to protect electronic measurement, control and switching circuits, mainly also telecommunications equipment and systems, wherever they are used, against transient overvoltages, an overvoltage protection element and overvoltage protection means have been developed and have been known for more than 20 years.

An important component of overvoltage protection elements of the type under consideration here is at least one spark gap which operates at a certain overvoltage, the sparkover voltage, and thus, prevents overvoltages which are greater than the sparkover voltage of the spark gap from occurring in the circuit which is being protected by the overvoltage protection means.

It was stated initially that the overvoltage protection element of the type under consideration has two electrodes and an air breakdown spark gap which is located and which works between the two electrodes. An air breakdown spark gap is generally a breakdown spark gap; therefore, it is also to encompass a breakdown spark gap in which not air, but another gas is present between the electrodes. In addition to overvoltage protection elements with an air breakdown spark gap, there are overvoltage protection elements with an air flashover spark gap in which a creeping discharge occurs upon operation.

Overvoltage protection elements with an air breakdown spark gap compared to overvoltage protection elements with an air flashover spark gap have the advantage of a higher peak current carrying capacity, but the disadvantage of a higher sparkover voltage which is not especially constant. Thereforem various overvoltage protection elements with an air breakdown spark gap have been proposed which have been improved with reference to the sparkover voltage. In the area of the electrodes and the air breakdown spark gap which acts between the electrodes, ignition aids have been implemented in various ways, for example, such that at least one ignition aid which triggers a creeping discharge has been provided between the electrodes and projects at least partially into the air breakdown spark gap. Such an ignition aid is made in the manner of a bridge, and is made of plastic (see, for example, German Patent Applications DE 41 41 681 A1, DE 42 44 051 A1 or DE 44 02 615 A1).

The ignition aids which were addressed above and which are provided in the known overvoltage protection elements can, more or less, be called “passive ignition aids” because they do not operate “actively” themselves, but only operate by an overvoltage which occurs on the main electrodes.

German Patent Application 198 03 636 and corresponding U.S. Pat. No. 6,111,740 disclose an overvoltage protection element and an overvoltage protection means with two electrodes, with an air breakdown spark gap which acts between the electrodes, and an ignition aid. In this known overvoltage protection means the ignition aid is made as an “active ignition aid,” specifically in that, in addition to the two electrodes—there called the main electrodes—there are two more ignition electrodes. These two ignition electrodes form a second air breakdown spark gap which is used as an ignition spark gap. In this known overvoltage protection means, the ignition aid includes not only the ignition spark gap, but also an ignition circuit with an ignition switching element. When there is an overvoltage on the known overvoltage protection means, the ignition circuit with the ignition switching element provides for operation of the ignition spark gap. The ignition spark gap and the two ignition electrodes are arranged with respect to the two main electrodes such that, because the ignition spark gap has operated, the air breakdown spark gap between the two main electrodes operates. The operation of the ignition spark gap leads to ionization of the air present in the air breakdown spark gap so that the air breakdown spark gap between the two main electrodes also operates suddenly after the ignition spark gap operates.

In the known embodiments of the overvoltage protection elements described above with ignition aids, the latter lead to an improved, specifically a lower and more constant sparkover voltage. However, the disadvantage of an active ignition aid is that an additional ignition circuit with an ignition switching element is necessary to effect operation of the ignition spark gap. Here, there is the danger that the ignition spark gap and the ignition circuit with the ignition switching element will be destroyed by a lightning stroke current or the main follow current which generally occurs.

SUMMARY OF THE INVENTION

Therefore, a primary object of the present invention is to provide an overvoltage protection element of the initially mentioned type in which a relatively low sparkover voltage, which is as constant as possible, can be ensured in an especially simple and effective manner. It should be possible to produce the ignition element used for this purpose as easily. and thus. as economically as possible.

The overvoltage protection element in accordance with the invention, in which the aforementioned object is achieved, is characterized, first of all, essentially in that the ignition element is made and arranged such that, between the two electrodes, there is an area of weakened insulation (ignition area) and that, when there is a voltage applied to the ignition element, a discharge on the surface of the ignition element leads to a conductive connection between the two electrodes, the conductive connection having a low current carrying capacity.

Thus, a completely new overvoltage protection element with an ignition element and a completely new ignition element for use in an overvoltage protection element are implemented, as follows from the description of operation below.

The ignition element is chosen and dimensioned such that, when there is a voltage which is larger than the sparkover voltage of the overvoltage protection element, a creeping discharge on the surface of the ignition element occurs, which leads to a conductive connection between the two electrodes bordering the ignition element. When this conductive connection is loaded with a discharge current, due to the low current carrying capacity of the conductive connection the latter "burns out." This "burn-out" causes ionization of the ignition area so that ignition of the air breakdown spark gap between the two electrodes suddenly occurs.

The conductive connection between the two electrodes of the air breakdown spark gap which occurs intentionally distinguishes the overvoltage protection element as of the invention from known overvoltage protection elements. The prior art (see, German Patent Application 198 03 636 and corresponding U.S. Pat. No. 6,111,740) discloses placing an element of insulating material between the two electrodes, but according to its function as a spacer this element is made of an insulator which also permanently ensures the desired insulation between the two electrodes when an arc is present. German Patent Application DE 42 44 051 A1, likewise, discloses an overvoltage protection element in which there is an ignition element of insulating material between the two electrodes; however, in this known overvoltage protection element, ignition of the air breakdown spark gap takes place only by a creeping discharge occurring on the ignition element. In the known overvoltage protection element, by placing the ignition element between the two electrodes, an auxiliary air flashover spark gap is implemented; conversely, there is no conductive connection between the two electrodes via the ignition element.

The above described arrangement and execution of the ignition element can preferably proceed by the area of weakened insulation (ignition area) being implemented by a recess in the ignition element. This recess can easily be, for example, a hole which has been made in the ignition element, then the ignition area being completely surrounded by the ignition element. However, in addition, it is also possible to make the ignition area on the edge side in the ignition element.

The material for the ignition element, preferably, is plastic with a relatively low CTI (comparative tracking index) value. By using a plastic with a low CTI value, and thus with a low resistance to tracking, the intended execution of the conductive connection on the surface of the ignition element is promoted. In contrast, in the known overvoltage protection elements, for the spacers located between the electrodes, plastics, for example, POM, with a CTI value as high as possible can be used.

According to another preferred configuration of the invention, the ignition element is made and arranged such that, when there is an arc between the electrodes, carbonization of the surface of the ignition element occurs. This results in that, for repeated occurrence of an overvoltage, the initial conditions of a conductive connection with low current carrying capacity between the two electrodes on the surface of the ignition element are present again, so that initial ignition of the air breakdown spark gap and "burn-out" of the conductive connection, and thus, ionization of the ignition element occur again. In this way, an overvoltage protection element is provided which also has a constant operating behavior with a low sparkover voltage for several overvoltages which occur in succession in time.

To improve the operating behavior of the overvoltage protection element of the invention, when an overvoltage first appears, according to one preferred configuration, a conductive coating with low current carrying capacity is applied on the surface of the ignition element. In this way, a conductive connection between the two electrodes is ensured which is independent of the carbonization which occurs by the discharge on the surface of the ignition element. The coating can be implemented, for example, by chemical, electrothermal or thermal carbonization of the surface of the ignition element when the overvoltage protection element is produced.

Since, in the above described overvoltage protection element in accordance with the invention, a conductive connection between the two electrodes is implemented or is being implemented when an overvoltage is applied by a discharge on the surface of the ignition element, advantageously, a voltage switching element is series connected to the overvoltage protection element. The voltage switching element can be in particular a gas-filled surge arrester, a varistor or a suppressor diode. The voltage switching element, which is additionally series-connected, thus prevents a current from flowing via the overvoltage protection element in the normal case, i.e., when there is no overvoltage. In this overvoltage protection means which then comprises the overvoltage protection element according to the invention and the additional voltage switching element, the voltage switching element is chosen and dimensioned such that it becomes conductive, therefore "switches," at the sparkover voltage of the overvoltage protection means. In this way, then, there is an overvoltage on the overvoltage protection element and on the two electrodes; this then leads to the ignition of the air breakdown spark gap which was described in particular above by the initial ignition which was triggered by the ignition element.

The initially described ignition element, which can be used especially in the above described overvoltage protection element, can be produced especially easily and economically in that the ignition element consists comprises at least two electrically conductive layers and at least one insulating layer located in between, the insulating layer being connected to the electrically conductive layers by cementing or pressing and having an area of weakened insulation (ignition area). The ignition element of the invention can thus be produced according to the known production processes for multilayer circuit boards, and for the most part, the materials known therefrom, i.e., copper foils for the electrically conductive layers and polyimide films or FR4 films, can also be used for the insulating layer.

The use of electrically conductive layers or films, especially of copper foils and insulating films, for example, polyimide films, enables very short distances between the conductive layers to be produced with very close dimensional tolerances. The electrically conductive layers can be spaced or insulated so far apart from one another by the insulating layer that the electrical insulation is clearly above the sparkover voltage of the overvoltage protection element which can be expected in the least favorable case. In practice, both for the electrically conductive layers and also for the insulating layer, copper foils or polyimide films or FR4 films with thicknesses of 35 microns, 50 microns, 70 microns or 100 microns which are available on a standard basis can be used. However, of course, instead of copper foils also other metallic foils, electrically conductive plastic films can be used.

The area of weakened insulation (ignition area) in the insulating layer in which both initial ignition and also the actual ignition of the air breakdown spark gap occurs can be easily implemented by a recess or a hole in the insulating layer and optionally in addition in one or both electrically conductive layers. A hole which is made both in the insulating layer and also in the two conductive layers can also be produced for example easily by a corresponding hole after lamination of the individual layers.

With the corresponding dimensioning of the electrically conductive layers, they can directly assume the function of the electrodes of an overvoltage protection element, so that such an ignition element itself can act as the overvoltage protection element. Generally, the conductive layers of the ignition element are, however, made such that contact can be made directly with the electrodes of the overvoltage protection element.

In particular, there a host of possibilities for embodying and developing the overvoltage protection element according to the invention and the ignition element in accordance with the invention. In this respect, reference is made to the following detailed description of preferred embodiments in conjunction with the accompanying drawings.

DETAILED DESCRIPTION OF THE INVENTION

Figure 1:
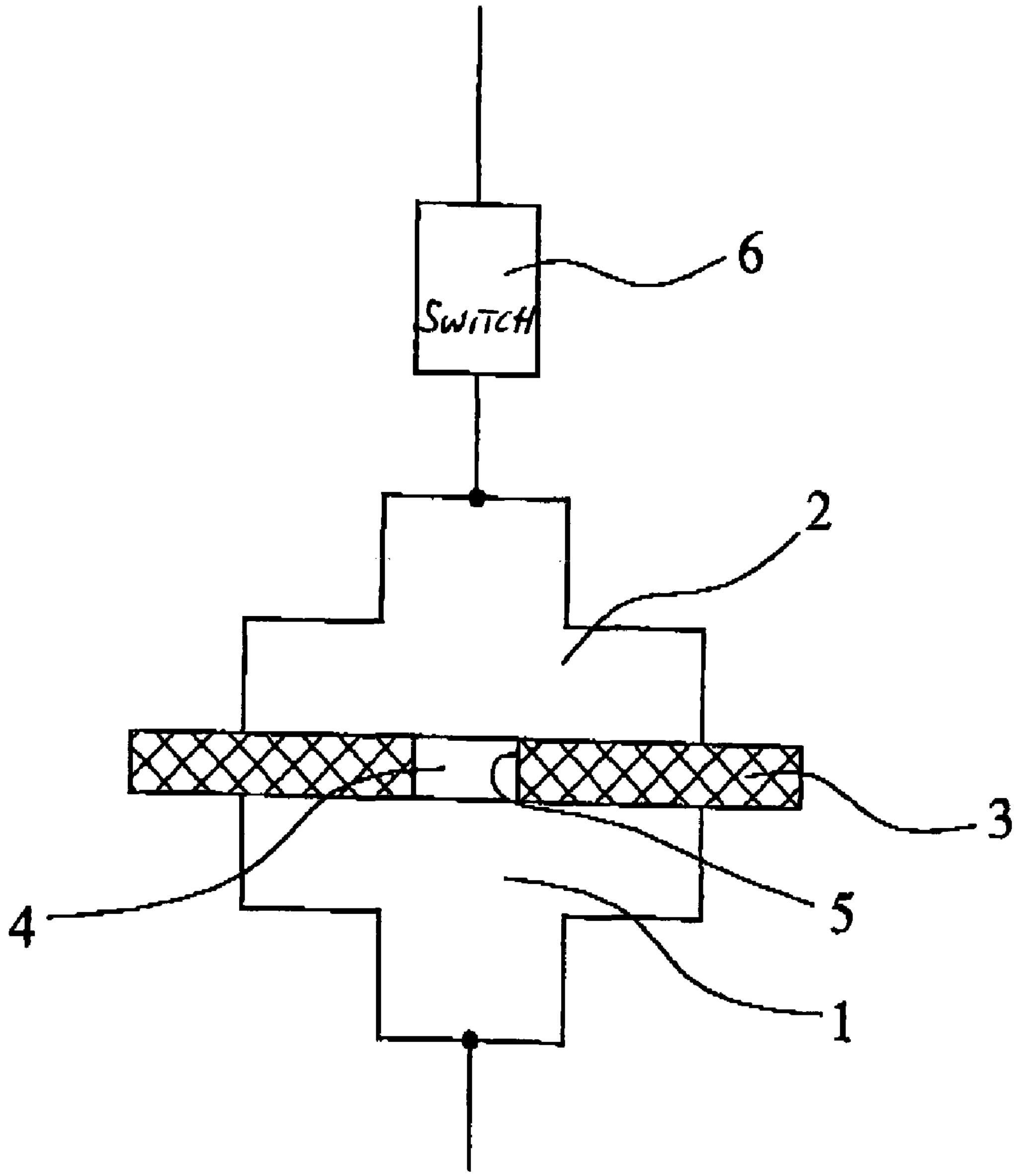
FIG. 1 is a schematic sketch of one embodiment of the overvoltage protection element in accordance with the invention.

FIG. 1 shows an overvoltage protection element in accordance with the invention only with respect to its fundamental structure. The illustrated overvoltage protection element includes a first electrode 1, a second electrode 2, an ignition element 3 which is located between the two electrodes 1, 2, and an air breakdown spark gap 4 which works and is present between the two electrodes 1, 2. When the air breakdown spark gap 4 is ignited, an arc (not shown) forms between the two electrodes 1, 2, via which arc the lightning stroke current which is to be discharged flows.

The ignition element 3 is arranged such that, between the two electrodes 1, 2, an area of weakened insulation (ignition area) is provided in which the arc is formed when the air breakdown spark gap 4 ignites. The ignition element 3 of the invention is made such that, when there is a voltage on the ignition element 3, a discharge on the surface 5 of the ignition element 3 leads to a conductive connection between the two electrodes 1, 2, the conductive connection having only a small current carrying capacity. If, at this point, a discharge current begins to flow via this conductive connection, as a result of the low current carrying capacity of the conductive connection, the latter burns out, and thus, the ignition area ionizes; this leads to sudden ignition of the air breakdown spark gap 4.

The arc which forms when the air breakdown spark gap 4 ignites, with suitable dimensioning of the ignition element 3, provides for "carbonization" occurring on the surface 5 of the ignition element 3. This results in that, when an overvoltage occurs again, a conductive connection with low current carrying capacity is present again between the two electrodes 1, 2, which connection, when loaded with a discharge current, in turn, leads to burn out, and thus, to initial ignition of the air breakdown spark gap 4, thereby resulting in ignition of the overvoltage protection element.

Since, in such an overvoltage protection element, when a normal voltage is present—intentionally—there is also a conductive connection between the two electrodes 1, 2, as shown in FIG. 1, an additional voltage switching element 6, for example, a varistor and/or a gas-filled surge arrester, is connected in series to the actual overvoltage protection element. In this overvoltage protection means, which comprises the overvoltage protection element of the invention and the additional voltage switching element 6, the voltage switching element 6 is dimensioned such that it becomes conductive at the sparkover voltage of the overvoltage protection means. If an overvoltage occurs on the overvoltage protection means, this leads to switching of the voltage switching element 6 so that, then, the overvoltage is on the two electrodes 1, 2; this leads to the above described ignition of the air breakdown spark gap 4 by the initial ignition of the ignition element 3 which has been triggered by current ignition. On the other hand, the voltage switching element 6 prevents an unwanted current from flowing via the overvoltage protection element in the normal case, i.e., when there is no overvoltage.

Preferred embodiments of the ignition element 3 in accordance with the invention are explained below using FIGS. 2 to 8.

Figure 2A:
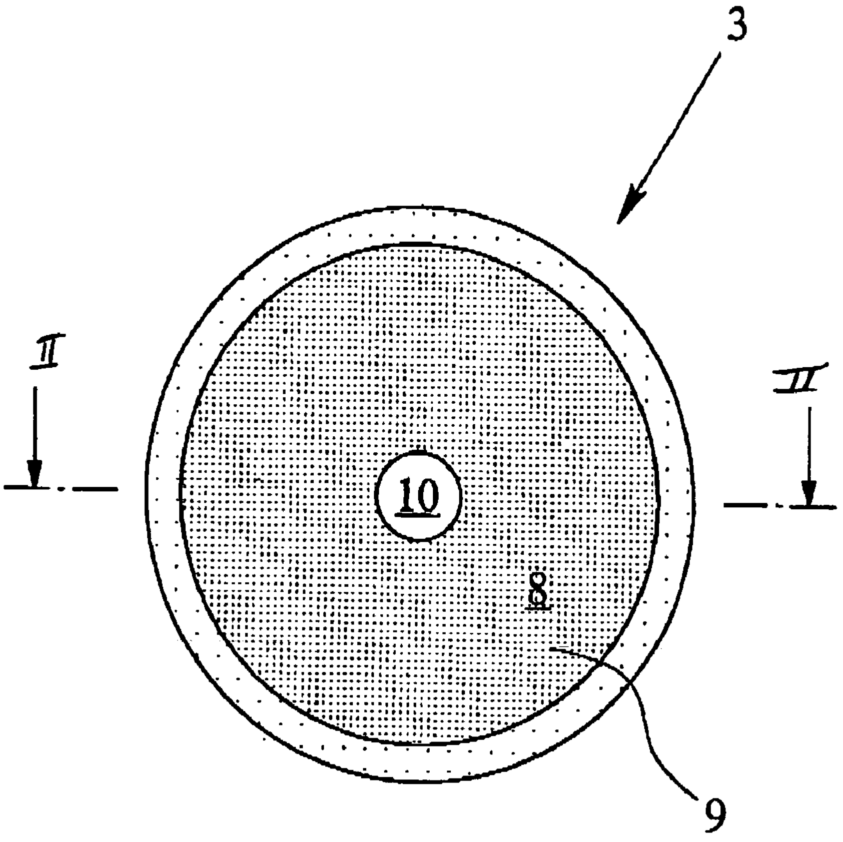
FIG. 2*a* is a plan view of a first embodiment of the ignition element of the invention and FIG. 2*b* is a sectional view taken along line II-II of FIG. 2*a*.
Figure 2B:
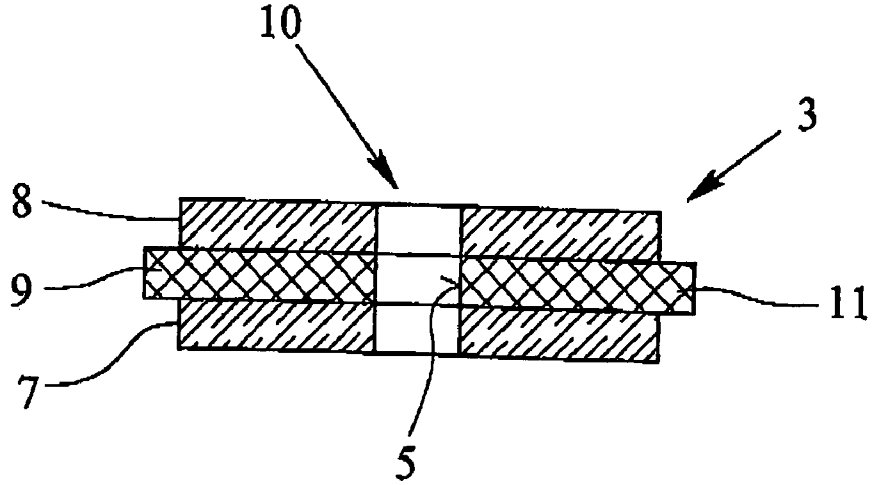
Figure 3A:
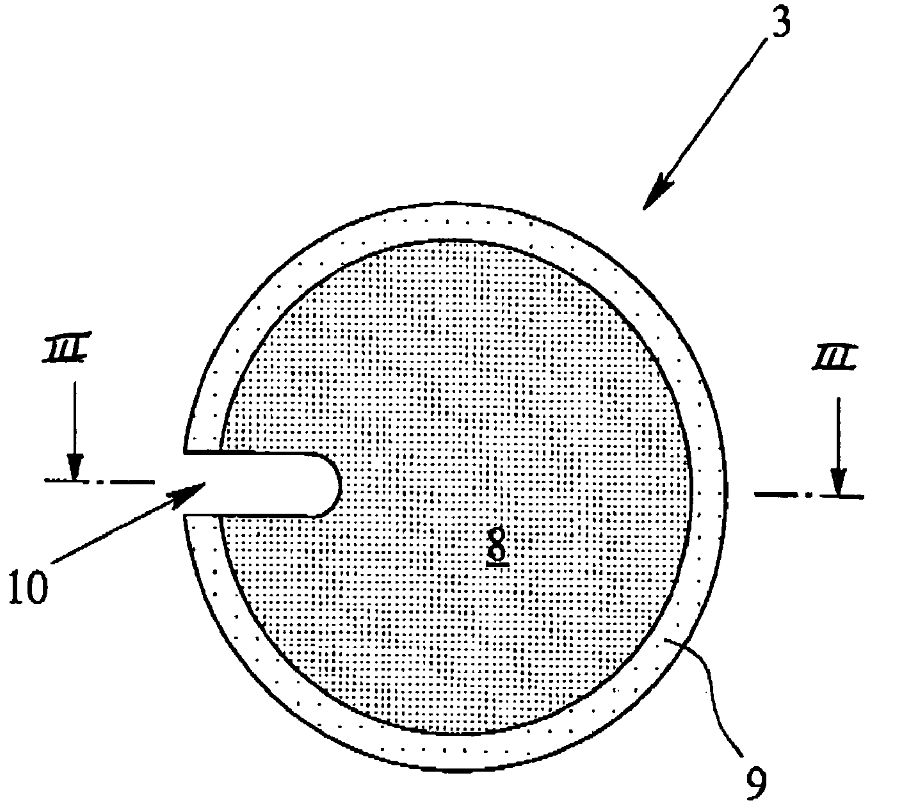
FIG. 3*a* shows second embodiment of the ignition element of the invention in a plan view and FIG. 3*b* is a sectional view taken along line III-III of FIG. 3*a*, FIGS. 4*a* & 4*b* show an embodiment of an ignition element, similar to the version as shown in FIG. 1, FIG. 4*b* being a sectional view along line IV-IV in FIG. 4*a*, FIGS. 5*a* & 5*b* show an embodiment of an ignition element with a host of electrically conductive and insulating layers, FIG. 5*b* being a section view along line V-V of FIG. 5*a*.
Figure 3B:
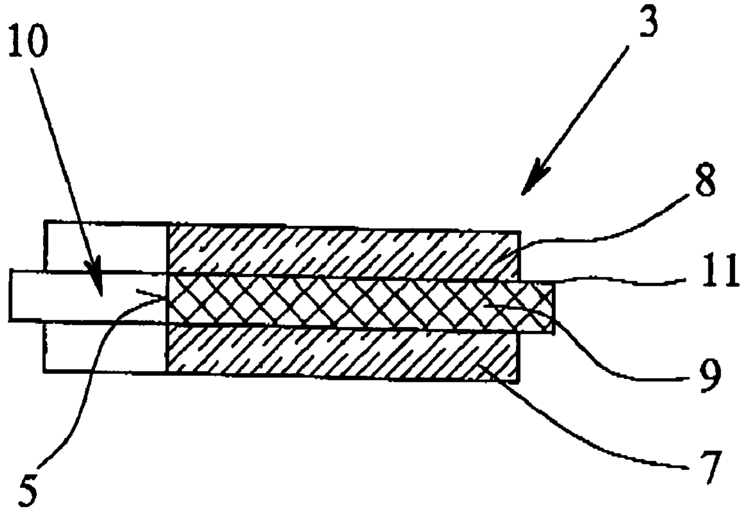
Figure 4A:
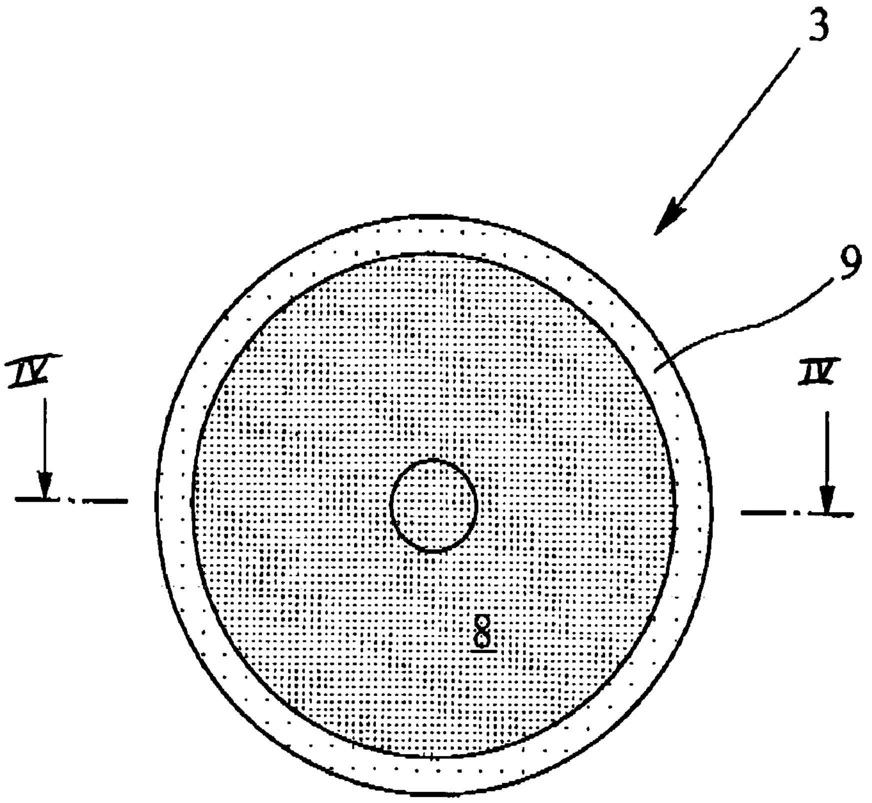
Figure 4B:
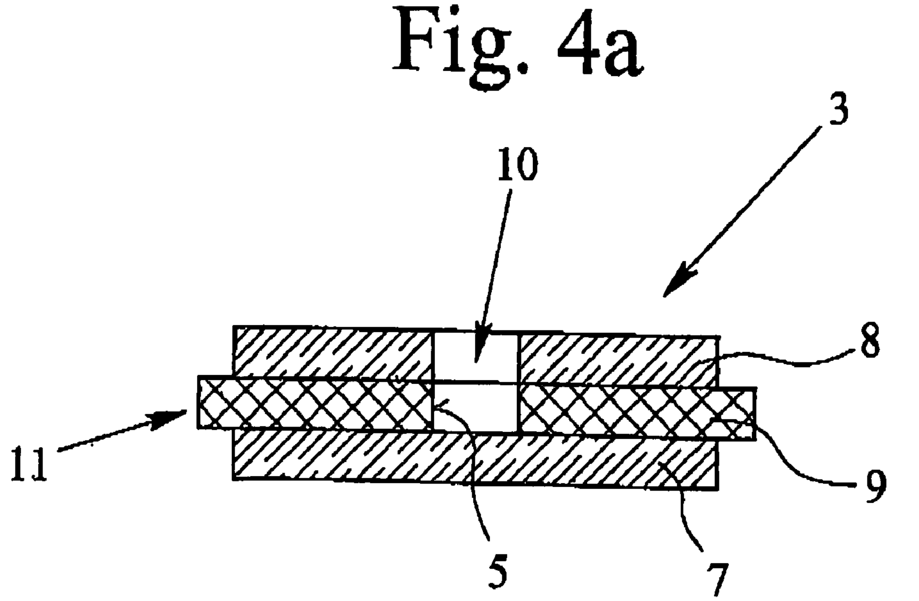

The ignition element 3 which is shown in FIGS. 2 to 4 comprises two conductive layers 7, 8, and an insulating layer 9 which is located in between, the area of weakened insulation being implemented by a recess 10 in the insulating layer 9. The recess which, for example, can be made as shown in FIGS. 1 & 3 as a center hole can be easily produced by drilling or cutting. As a comparison of FIGS. 2 and 4 shows, the recess 10 can be made either only in one conductive layer 7 or in two conductive layers 7, 8.

Production of the ignition element 3 of the invention is especially simple in that production processes can be used which are known from the production of multilayer circuit boards. Thus, the conductive layers 7, 8, which can be, for example, standardized copper foils, can be connected to the insulating layer 9 by lamination. Materials known from production of multilayer circuit boards, such as polyimide films or FR4 films, with thicknesses from 35 to 100 microns and are available on a standard basis, are also suitable for the insulating layer 9. In this way, the distance between the conductive layers 7, 8, which can be connected directly to the electrodes 1, 2 can be set very small, but also very precisely, by which very small sparkover voltages can be implemented.

In a circular version of the ignition element 3, which is shown in the embodiments, the insulating layer 9 has a slightly larger outside diameter than the conductive layers 7, 8 so that, on the edge area 11 of the ignition element 3, due to the lengthened creepage distance, there is increased insulation which prevents ignition in this area.

Figure 5A:
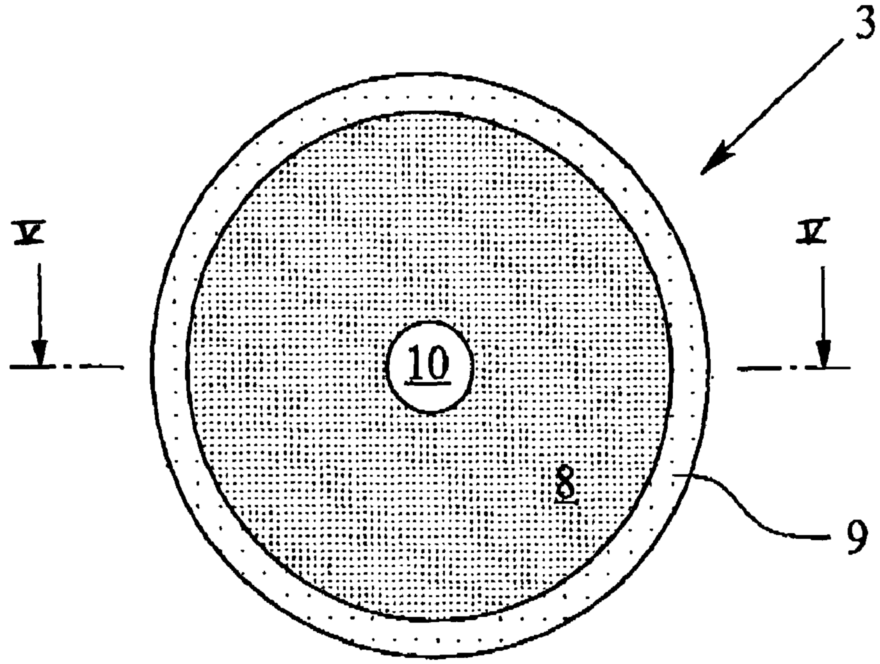
Figure 5B:
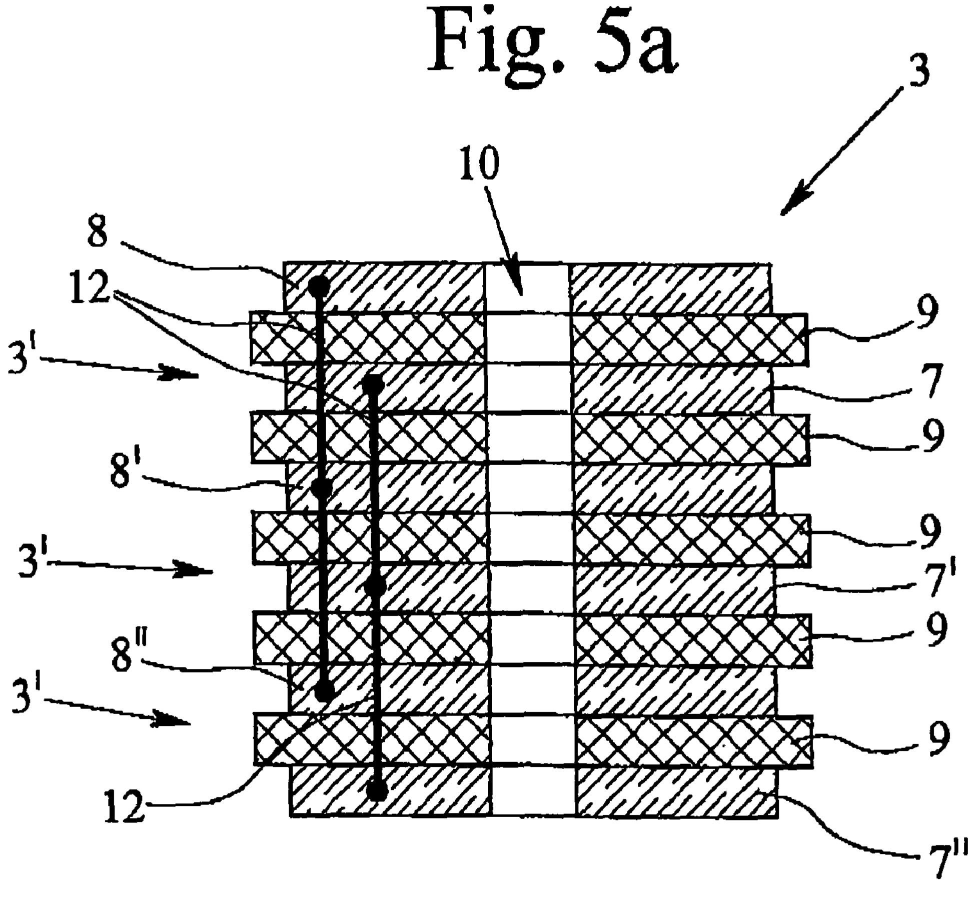

FIG. 5 shows an embodiment of an ignition element 3 which has several conductive layers 7, 8 and several insulating layers 9. In this embodiment, the three conductive layers 7, 7', 7'' and the three conductive layers 8, 8', 8'' are electrically connected respectively to one another (as represented by reference numeral 12), so that altogether there are six conductive layers 7, 7', 7'' and 8, 8', 8'', but they have only two different potentials, the two potentials each being arranged in alternation to one another and being separated by an insulating layer 9. Of course, instead of the illustrated six conductive layers, there can also be even more conductive layers arranged in alternation with two different potentials.

This duplication of the structure of the ignition element 3 shown schematically in FIG. 2 can equalize production-induced fluctuations with respect to the properties of the insulating layers 9 and the resulting fluctuations with respect to the sparkover voltage of the ignition element 3. For the embodiment of the ignition element 3 shown in FIG. 5, initial ignition is always triggered by the partial ignition element 3' which has the smallest sparkover voltage, i.e., for otherwise identical properties, for the partial ignition element 3' with the thinnest insulating layer 9.

Figure 6A:
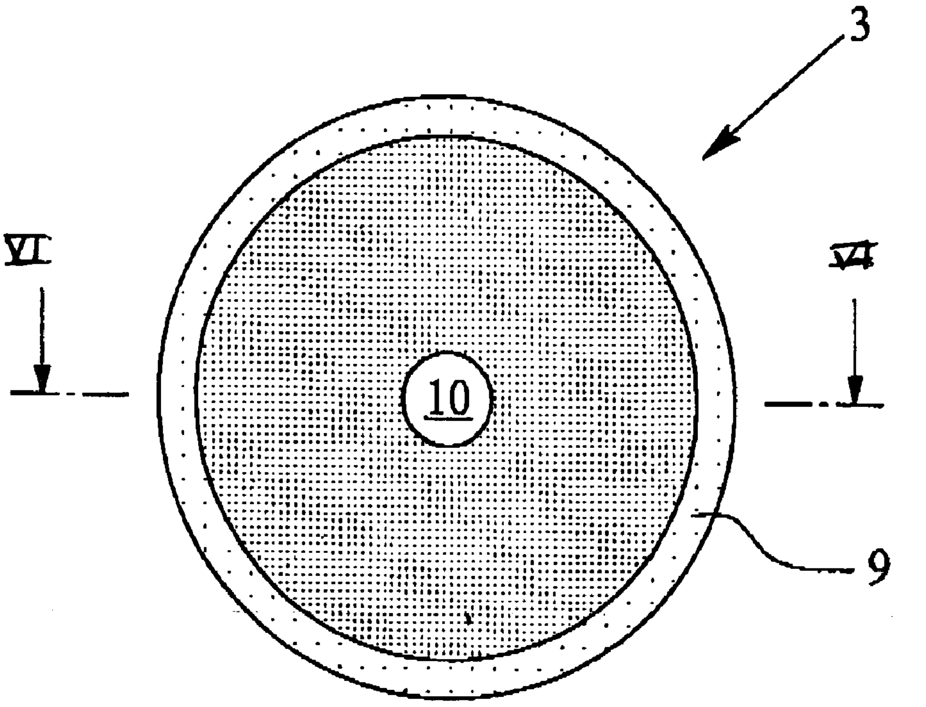
FIGS. 6*a* & 6*b* show another embodiment of an ignition element with a host of electrically conductive and insulating layers, FIG. 6*b* being a section view along line VI-VI of FIG. 6*a*.
Figure 6B:
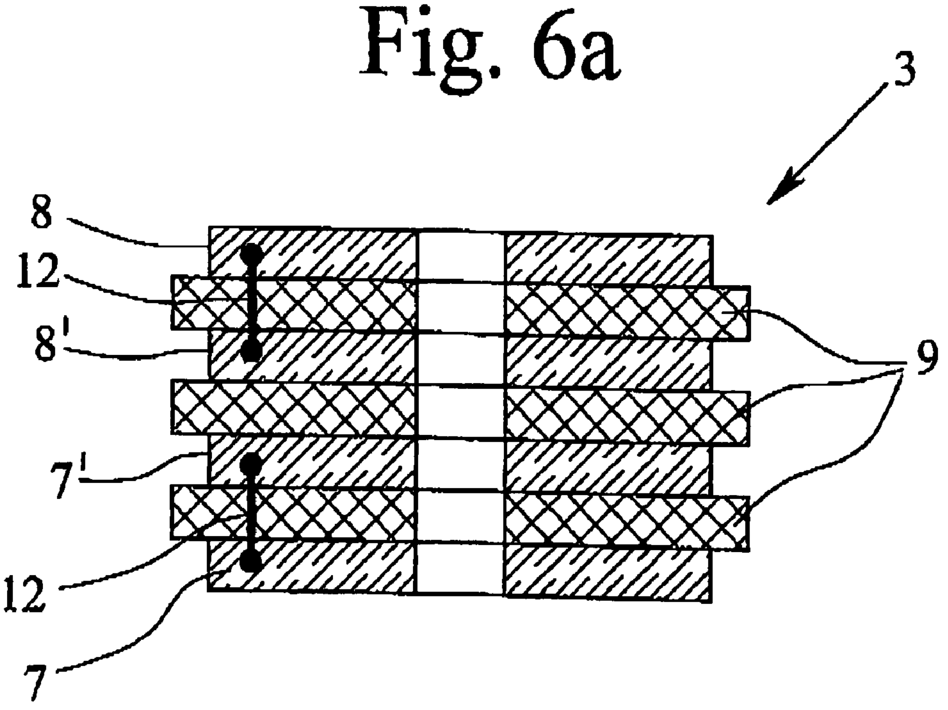

In the embodiment as shown in FIG. 6, the ignition element 3 also has several conductive layers 7, 7', 8, 8' and several insulating layers 9, the conductive layers 7, 7' and 8, 8' being electrically connected to one another (as represented by reference numeral 12) so that there are simply two different potentials here. However, in contrast to the embodiment shown in FIG. 5, here, the two different potentials are not arranged repeatedly in alternation. The advantage of this embodiment compared to the embodiment shown in FIG. 2 is that, after igniting the air breakdown spark gap 4, the arc flashes over directly onto the outside conductive layers 7, 8, so that a larger arc is present.

Figure 7A:
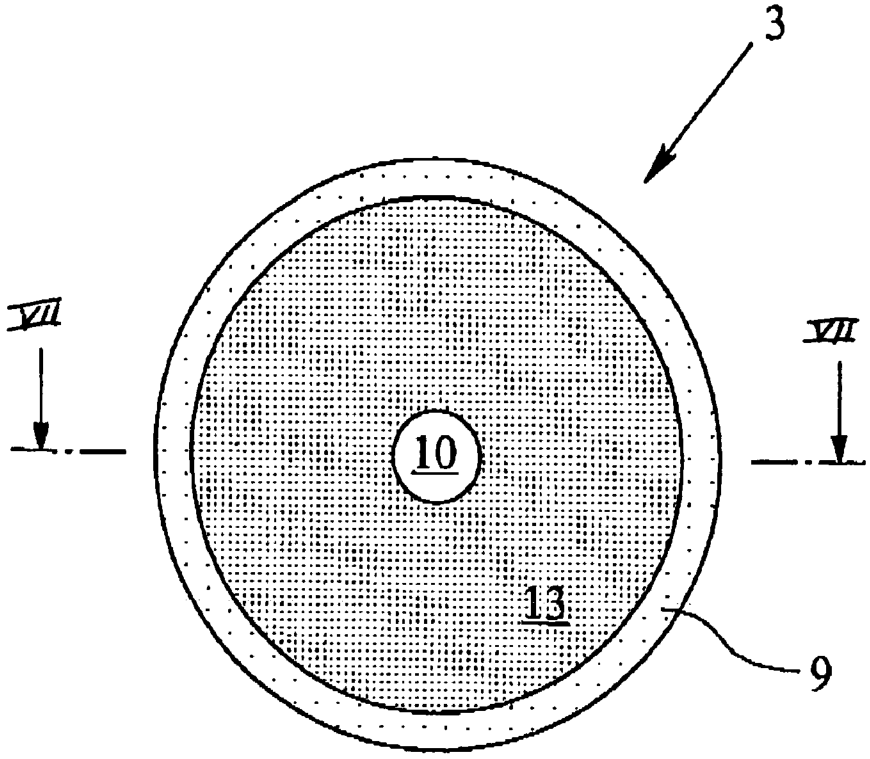
FIGS. 7*a* & 7*b* show an embodiment of an ignition element for a multiphase overvoltage protection system, FIG. 7*b* being a section view along line VII-VII of FIG. 7*a* and FIGS. 8*a* & 8*b* show another embodiment of an ignition element for a multiphase overvoltage protection element, FIG. 8*b* being a section view along line VIII-VIII of FIG. 8*a*.
Figure 7B:
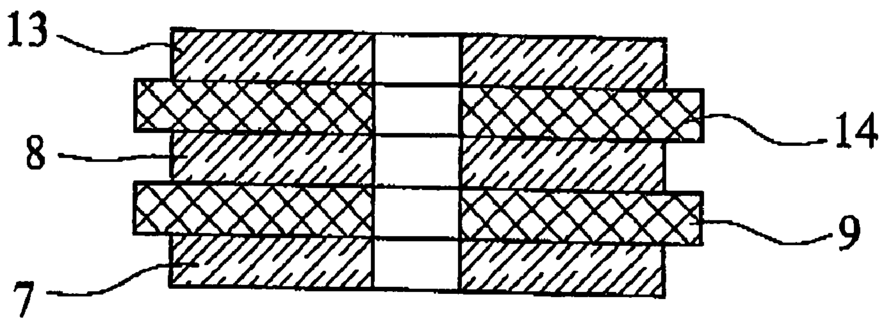
Figure 8A:
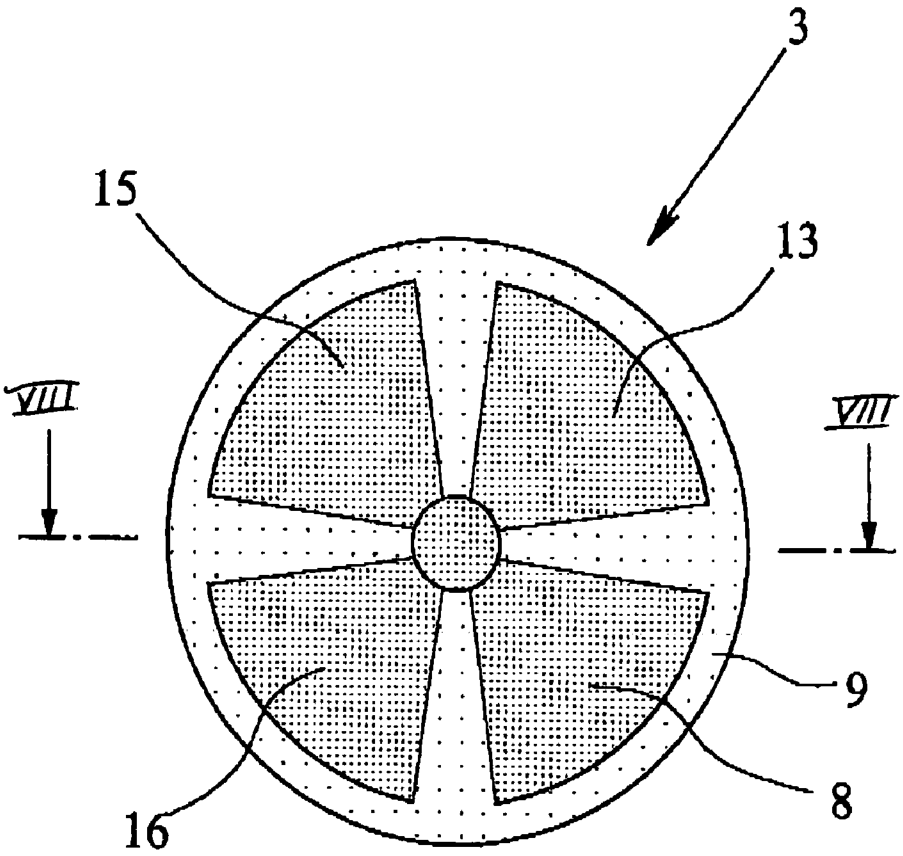
Figure 8B:
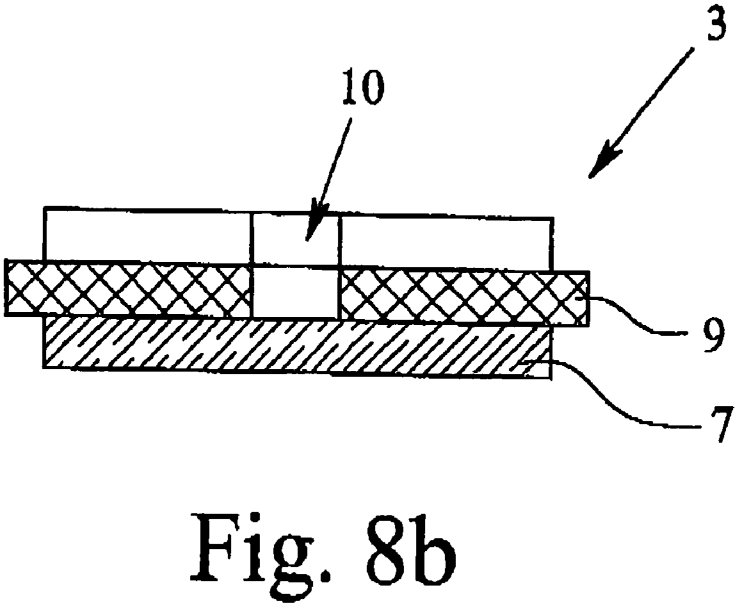

Finally, FIGS. 7 & 8 show two embodiments of an ignition element 3 with three potentials which are located horizontally over one another (FIG. 7) and four potentials located horizontally next to one another (FIG. 8). These ignition elements 3 are thus suited for use in an overvoltage protection element which is used in a three-phase network. In contrast to the embodiment as shown in FIG. 2, in the ignition element 3 as shown in FIG. 7, there is a third conductive layer 13 which is separated from the second conductive layer 8 by a second insulating layer 14 so that the three conductive layers 7, 8, 13 have three different potentials.

For the ignition element 3, as is shown in FIG. 8, in addition to the circular conductive layer 7 and a likewise circular insulating layer 9, there are other conductive layers 8, 13, 15, 16 which are not connected to one another. The conductive layers 8, 13, 15, 16 are each made in the shape of a sector of a circle, and are located next to one another, the circular conductive layer 7 being located opposite all of them. When there is an overvoltage between the first conductive layer 7 and one of the other conductive layers 8, 13, 15 or 16, first of all, initial ignition of the respective air breakdown spark gap 4 occurs, as a result of the arrangement of the individual conductive layers 8, 13, 15, 16 relative to one another and to the conductive layer 7, ignition of all of the air breakdown spark gap 4 takes place. With the corresponding connection of the overvoltage protection element, thus the desired level of protection is ensured, not only between the active phase conductors and the neutral conductor, and between the neutral conductor and the ground, but between all line branches.

What is claimed is:

1. Overvoltage protection element for discharging transient overvoltages, comprising:

at least two electrodes, at least one ignition element of insulating material located between an active surface of the electrodes, and an air breakdown spark gap which acts between the electrodes when the air breakdown spark gap is ignited by an arc being formed between the two electrodes, wherein the at least one ignition element is made and arranged such that, between the at least two electrodes there is an area of weakened insulation which forms an ignition area, wherein, when there is a voltage applied to the at least one ignition element, a creeping discharge on a surface of the at least one ignition element occurs leading to a conductive connection between the two electrodes at a location bordering the at least one ignition element before an arc is formed between the two electrodes, the conductive connection having a low current carrying capacity, so that the conductive connection burns out when it is loaded with a discharge current, due to the low current carrying capacity of the conductive connection, wherein the burn out of the conductive connection causes ionization of the ignition area, so that ignition of the air breakdown spark gap between the two electrodes suddenly occurs, wherein the ignition element is made and arranged such that, when there is an arc between the electrodes, carbonization of the surface of the ignition element occurs, and wherein the at least one ignition element is made of an insulating material with a relatively low comparative tracking index (CTI) value, wherein said surface of the ignition element has a conductive coating with low current carrying capacity thereon, and wherein the coating comprises one of a chemical, thermal and electrothermal carbonization.

2. Overvoltage protection element as claimed in claim 1, wherein the area of weakened insulation is implemented by a recess in the ignition element.

3. Overvoltage protection element as claimed in claim 1, wherein the conductive connection is formed only on the surface of the ignition element.

4. Ignition element for use in an overvoltage protection element, wherein the ignition element comprises: at least two electrically conductive layers, and at least one insulating layer located between the electrically conductive layers, the at least one insulating layer being connected to the electrically conductive layers by cementing or pressing, the at least one insulating layer having an area of weakened insulation and being made of an insulating material with a relatively low CTI value, wherein the ignition element is made and arranged between two electrodes such that, there is an area of weakened insulation which forms an ignition area between the two electrodes, wherein, when there is a voltage applied to the ignition element, a creeping discharge on a surface of the insulating layer leads to a conductive connection between the at least two electrically conductive layers before an arc is formed between the two electrodes, the conductive connection having a low current carrying capacity, so that the conductive connection burns out when it is loaded with a discharge current due to the low current carrying capacity of the conductive connection, wherein the burn out of the conductive connection causes ionization of the ignition area, so that ignition of an air breakdown spark gap between the two electrodes bordering the insulation layer of the ignition element suddenly occurs, and wherein the ignition element is made and arranged such that, when there is an arc between the electrodes, carbonization of the surface of the ignition element occurs.

5. Ignition element as claimed in claim 4, wherein the area of weakened insulation is a recess or a hole in at least the at least one insulating layer.

6. Ignition element as claimed in claim 4, comprising at least three electrically conductive layers and at least two insulating layers, wherein at least two electrically conductive layers are electrically connected to one another.

7. Ignition element as claimed in claim 6, wherein the area of weakened insulation comprises a recess or hole in at least the at least two insulating layers.

8. Ignition element as claimed in claim 4, wherein the electrically conductive layers comprise copper foils and the at least one insulating layer comprises a polyimide film or FR4 film.

9. Ignition element as claimed in claim 4, wherein conductive fibers or metal particles are located insulated in the at least one insulating layer.

10. Ignition element as claimed in claim 4, wherein at least one of the electrically conductive layers and the insulating layer have a thickness of less than 0.2 mm.

11. Ignition element as claimed in claim 4, wherein at least one of the electrically conductive layers and the insulating layer have a thickness of from 35 microns to 70 microns.

12. Ignition element as claimed in claim 4, wherein the electrically conductive layers comprise copper foils and the at least one insulating layer comprises a polyimide film or FR4 film, wherein conductive fibers or metal particles are located insulated in the insulating layer, and wherein at least one of the electrically conductive layers and the insulating layer have a thickness of less than 0.2 mm.

13. Ignition element as claimed in claim 4, wherein the electrically conductive layers comprise copper foils and the at least one insulating layer comprises a polyimide film or FR4 film, wherein conductive fibers or metal particles are located insulated in the insulating layer, and wherein at least one of the electrically conductive layers and the insulating layer have a thickness of from 35 microns to 70 microns.

14. Ignition element as claimed in claim 5, wherein the area of weakened insulation is a recess or a hole in at least the at least one conductive layer.

15. Ignition element as claimed in claim 4, wherein a voltage switching element is connected in series with one of the electrodes, said voltage switching element being dimensioned such that it becomes conductive at the sparkover voltage of the overvoltage protection means so as to prevent an unwanted current from flowing via the overvoltage protection element when there is no overvoltage.

* * * * *